United States Patent
Hickson et al.

(10) Patent No.: US 10,635,979 B2
(45) Date of Patent: Apr. 28, 2020

(54) CATEGORY LEARNING NEURAL NETWORKS

(71) Applicant: Google LLC, Mountain View, CA (US)

(72) Inventors: Steven Hickson, Mountain View, CA (US); Anelia Angelova, Sunnyvale, CA (US); Irfan Aziz Essa, Atlanta, GA (US); Rahul Sukthankar, Orlando, FL (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 16/511,637

(22) Filed: Jul. 15, 2019

(65) Prior Publication Data
US 2020/0027002 A1    Jan. 23, 2020

Related U.S. Application Data

(60) Provisional application No. 62/701,280, filed on Jul. 20, 2018.

(51) Int. Cl.
*G06N 3/08*    (2006.01)
*G06N 20/00*    (2019.01)
(Continued)

(52) U.S. Cl.
CPC ............ *G06N 3/088* (2013.01); *G06K 9/628* (2013.01); *G06K 9/6218* (2013.01);
(Continued)

(58) Field of Classification Search
CPC ...... G06N 3/088; G06N 20/00; G06K 9/6218; G06K 9/6272; G06K 9/628; G06T 7/50; G06T 2207/20084; G06T 2207/20081
See application file for complete search history.

(56) References Cited

U.S. PATENT DOCUMENTS 8,411,932 B2 * 4/2013 Liu ..................... H04N 13/261
                                                           382/154
9,940,551 B1 * 4/2018 Mordvintsev .......... G06K 9/627
(Continued)

OTHER PUBLICATIONS

Agrawal et al, "Learning to see by moving" arXiv, Sep. 2015, 12 pages.
(Continued)

*Primary Examiner* — Xuemei G Chen
(74) *Attorney, Agent, or Firm* — Fish & Richardson P.C.

(57) ABSTRACT

Methods, systems, and apparatus, including computer programs encoded on a computer storage medium, for determining a clustering of images into a plurality of semantic categories. In one aspect, a method comprises: training a categorization neural network, comprising, at each of a plurality of iterations: processing an image depicting an object using the categorization neural network to generate (i) a current prediction for whether the image depicts an object or a background region, and (ii) a current embedding of the image; determining a plurality of current cluster centers based on the current values of the categorization neural network parameters, wherein each cluster center represents a respective semantic category; and determining a gradient of an objective function that includes a classification loss and a clustering loss, wherein the clustering loss depends on a similarity between the current embedding of the image and the current cluster centers.

20 Claims, 5 Drawing Sheets

(51) Int. Cl.
  *G06K 9/62* (2006.01)
  *G06T 7/50* (2017.01)
(52) U.S. Cl.
  CPC ........... *G06K 9/6272* (2013.01); *G06N 20/00* (2019.01); *G06T 7/50* (2017.01); *G06T 2207/20081* (2013.01); *G06T 2207/20084* (2013.01)

(56) References Cited

U.S. PATENT DOCUMENTS

| | | | | |
|---|---|---|---|---|
| 10,178,527 | B2* | 1/2019 | Sharifi | H04L 67/22 |
| 10,181,091 | B2* | 1/2019 | Song | G06K 9/6212 |
| 10,192,415 | B2* | 1/2019 | Heitz, III | G08B 13/19656 |
| 10,311,339 | B2* | 6/2019 | Seybold | G06K 9/6262 |
| 2016/0180151 | A1* | 6/2016 | Philbin | G06K 9/00288 382/118 |
| 2018/0189325 | A1* | 7/2018 | Hohwald | G06F 3/04817 |
| 2018/0247107 | A1* | 8/2018 | Murthy | G06K 9/00147 |
| 2018/0314881 | A1* | 11/2018 | Sud | G06N 3/0454 |
| 2019/0022863 | A1* | 1/2019 | Kundu | G06T 7/187 |
| 2019/0030371 | A1* | 1/2019 | Han | A61N 5/1039 |
| 2019/0034557 | A1* | 1/2019 | Alsallakh | G06K 9/4628 |
| 2019/0043003 | A1* | 2/2019 | Fisher | H04N 17/002 |
| 2019/0065897 | A1* | 2/2019 | Li | G06N 20/10 |
| 2019/0066843 | A1* | 2/2019 | Carlson | G16H 50/70 |
| 2019/0102646 | A1* | 4/2019 | Redmon | G06K 9/4619 |
| 2019/0108404 | A1* | 4/2019 | Xu | G06K 9/00771 |
| 2019/0130231 | A1* | 5/2019 | Liu | G06N 3/0454 |
| 2019/0130292 | A1* | 5/2019 | N | G06N 3/0454 |
| 2019/0138888 | A1* | 5/2019 | Sekiyama | G06N 3/0454 |
| 2019/0164290 | A1* | 5/2019 | Wang | G06T 7/10 |
| 2019/0205649 | A1* | 7/2019 | Ananthanarayanan | G06K 9/00711 |
| 2019/0258937 | A1* | 8/2019 | Alemi | G06N 3/0472 |
| 2019/0279045 | A1* | 9/2019 | Li | G06K 9/6228 |
| 2019/0286936 | A1* | 9/2019 | Fuchs | G06K 9/6211 |
| 2019/0286980 | A1* | 9/2019 | Backhus | G06N 3/04 |
| 2019/0314985 | A1* | 10/2019 | Sermanet | B25J 9/1697 |

OTHER PUBLICATIONS

Alexe et al [online], "Measuring the objectness of image windows" 2012, [retrieved: Jul. 16, 2019], retrieved from: URL <http://calvin.inf.ed.ac.uk/wp-content/uploads/Publications/alexe12pami.pdf>, 14 pages.
Bach et al, "Learning spectral clustering" Journal of Machine Learning Research, Mar. 2005, 39 pages.
Bart et al [online], "Unsupervised learning of visual taxonomies", 2008, [retrieved: Jul. 16, 2019] retrieved from: URL <https://www.ics.uci.edu/~welling/publications/papers/A1854CR.pdf>, 8 pages.
Bengio et al, "Deep learning of representations for unsupervised and transfer learning" Proceedings of ICML Workshop on Unsupervised and Transfer Learning, 2012, 21 pages.
Bengio et al [online], "Learning deep architectures for ai", 2009, [retrieved on Jul. 24, 2019], retrieved from: URL<https://www.iro.umontreal.ca/~lisa/pointeurs/TR1312.pdf>, 56 pages.
Bengio et al, "Representation learning A review and new perspectives" arXiv, Apr. 2014, 30 pages.
Bengio et al, "Unsupervised feature learning and deep learning: A review and new perspectives" arXiv, Jun. 2012, 30 pages.
Bottou et al [online], "Convergence properties of the k-means algorithms" 1995 [retrieved: Jul. 16, 2019], retrieved from: URL <https://pdfs.semanticscholar.org/2352/d9105de31032538900dfb2ce7c95f6402963.pdf>, 8 pages.
Cordts et al, "The cityscapes dataset for semantic urban scene understanding" arXiv, Apr. 2016, 29 pages.
Doersch et al, "Multi-task self-supervised visual learning" arXiv, Aug. 2017, 13 pages.
Doersch et al, "Unsupervised visual representation learning by context prediction" arXiv, Sep. 2015, 9 pages.
Erhan et al, "Why does unsupervised pre-training help deep learning?" Journal of Machine Learning Research, Feb. 2010, 36 pages.
Faktor et al, "Video segmentation by non-local consensus voting" BMVC, 2014, 12 pages.
Felzenszwalb et al [online], "Efficient graph-based image segmentation" 2004, [retrieved: Jul. 16, 2019] retrieved from: URL <http://people.cs.uchicago.edu/~pff/papers/seg-ijcv.pdf>, 26 pages.
Godard et al, "Unsupervised monocular depth estimation with left-right consistency" arXIv, Apr. 207, 14 pages.
Grossberg, "3-d vision and figure-ground separation by visual cortex" Perception and Psychophysics, 1994, 74 pages.
Hadsell et al [online], "Dimensionality reduction by learning an invariant mapping" 2006 [retrieved: Jul. 16, 2019] retrieved from: URL <http://yann.lecun.com/exdb/publis/pdf/hadsell-chopra-lecun-06.pdf>, 8 pages.
He et al, "Deep residual learning for image recognition" CVPR, 2016, 9 pages.
Hickson et al [online], "Efficient hierachical graph-based segmentation of rgbd videos" 2014 [retrieved: Jul. 16, 2019] retrieved from: URL <https://www.cv-foundation.org/openaccess/content_cvpr_2014/papers/Hickson_Efficient_Hierarchical_Graph-Based_2014_CVPR_paper.pdf>, 8 pages.
Jain et al, "FusionSeg: Learning to combine motion and appearance for fully automatic segmentation of generic objects in video" arXiv, Apr. 2017, 12 pages.
Krizhevsky et al [online], "Learning multiple layers of features from tiny images" Apr. 2009, [retrieved: Jul. 16, 2019], retrieved from: URL<https://www.cs.toronto.edu/~kriz/learning-features-2009-TR.pdf>, 60 pages.
Kwak et al, "Unsupervised object discovery and tracking in video collections" ICCV, 2015, 9 pages.
Le et al, "Building high-level features using large scale unsupervised learning" arXiv, Jul. 2012, 11 pages.
Lin et al, "Network in network"arXiv, Dec. 2013, 9 pages.
Lotter et al, "Deep predictive coding networks for video prediction and unsupervised learning" arXiv, Aug. 2016, 12 pages.
Mirza et al, "Generalizable features from unsupervised learning" arXiv, Dec. 2016, 8 pages.
Misra et al, "Shuffle and learn: unsupervised learning using temporal order verification" arXiv, Jul. 2016, 21 pages.
Pathak et al, "Learning features by watching objects move" arXiv, Apr. 2017, 10 pages.
Radford et al, "Learning to generate reviews and discovering sentiment" arXiv, Apr. 2017, 9 pages.
Ramachandran et al, "Unsupervised pretraining for sequence to sequence learning" Nov. 2016, 20 pages.
Ren et al, "Faster r-cnn: Towards real-time object detection with region proposal networks" arXiv, Jan. 2016, 14 pages.
Russell et al [online], "Using multiple segmentations to discover objects and their extent in image collections" 2006, [retrieved: Jul. 16, 2019], retrieved from: URL <http://citeseerx.ist.psu.edu/viewdoc/download?doi=10.1.1.184.2856&rep=rep1&type=pdf>, 8 pages.
Simonyan et al, "Networks for large-scale image recogition" arXiv, Apr. 2015, 14 pages.
Singh et al [online], "Unsupervised discovery of mid-level discriminative patches" 2012, [retrieved: Jul. 16, 2019] retrieved from: URL <http://citeseerx.ist.psu.edu/viewdoc/download?doi=10.1.1.258.8920&rep=rep1&type=pdf>, 14 pages.
Sivic et al [online], "Unsupervised discovery of visual object class hierarchies" 2008, [retrieved: Jul. 16, 2019] retrieved from: URL <https://www.di.ens.fr/~josef/publications/sivic08.pdf>, 8 pages.
Srivastava et al, "Unsupervised learning of video representations" arXiv, Mar. 2015, 12 pages.
Szegedy et al [online], "Rethinking the inception architecture for computer vision" 2016 [retrived: Jul. 16, 2019], retrieved from: URL <https://www.cv-foundation.org/openaccess/content_cvpr_2016/papers/Szegedy_Rethinking_the_Inception_CVPR_2016_paper.pdf>, 9 pages.
Szegedy et al, "Going deeper with convolutions" IEEE, 2015, 9 pages.
Tian et al, "Learning deep representations for graph clustering" Proceedings of the Twenty-Eighth AAAI Conference on Artificial Intelligence, 2014, 7 pages.

(56) References Cited

OTHER PUBLICATIONS

Tokmakov et al, "Learning video object segmentation with visual memory" arXiv, Jul. 2017, 11 pages.

Vijayanarasimhan et al, "Sfm-net: Learning of structure and motion from video" arXiv, Apr. 2017, 9 pages.

Vincent et al [online], "Extracting and composing robust features with denoising autoencoders" 2008, [retrieved: Jul. 16, 2091], retrieved from: URL <http://www.cs.toronto.edu/~larocheh/publications/icml-2008-denoising-autoencoders.pdf>, 8 pages.

Vondrick et al [online], "Anticipating visual representations from unlabeled video" 2016, [retrieved: Jul. 16, 2019], retrieved from: URL <https://www.cv-foundation.org/openaccess/content_cvpr_2016/papers/Vondrick_Anticipating_Visual_Representations_CVPR_2016_paper.pdf>, 9 pages.

Wang et al [online], "Dynamic label propagation for semi-supervised multi-class multi-label classification" 2013 [retrieved: Jul. 16, 2019] retrieved from: URL <http://pages.ucsd.edu/~ztu/publication/iccv13_dlp.pdf>, 8 pages.

Wang et al, "Unsupervised learning of visual representations using videos" arXiv, Oct. 2015, 9 pages.

Xie et al, "Unsupervised deep embedding for clustering analysis" arXiv, May 2016, 10 pages.

Yang et al, "Joint unsupervised learning of deep representations and image clusters" arXiv, Jun. 2016, 19 pages.

Yang et al, "Towards k-means-friendly spaces: Simultaneous deep learning and clustering" arXiv, Jun. 2017, 14 pages.

Zhou et al [online], "Unsupervised learning of depth and ego-motion from video" presented at the Computer Vision and Pattern Recognition, Honolulu, HI, Jul. 21-26, 2017, retrieved on Jul. 16, 2019, <https://www.youtube.com/watch?v=HWu39YkGKvI>, 1 page [Video Submission].

\* cited by examiner

| Classes | Cluster 0 | Cluster 1 | Cluster 2 |
|---|---|---|---|
| Person | 3 | 47 | 100 |
| Rider | 6 | 5 | 7 |
| Car | 471 | 273 | 23 |
| Truck | 13 | 10 | 1 |
| Bus | 16 | 17 | 5 |
| Train | 2 | 5 | 0 |
| Motorcycle | 0 | 3 | 2 |
| Bicycle | 11 | 23 | 4 |
| Vegetation | 187 | 134 | 39 |
| Building | 333 | 404 | 174 |

CATEGORY LEARNING NEURAL NETWORKS

CROSS-REFERENCE TO RELATED APPLICATION

This application claims the benefit under 35 U.S.C. 119 of Provisional Application No. 62/701,280, filed Jul. 20, 2018, which is incorporated by reference.

BACKGROUND

This specification relates to image processing using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that retrieves objects from images and learns to cluster them into semantic categories without manual supervision.

According to a first aspect there is provided a method that includes training a categorization neural network to determine trained values of the categorization neural network parameters from initial values of the categorization neural network parameters. The training includes, at each of multiple iterations, processing an image depicting an object using the categorization neural network in accordance with current values of categorization neural network parameters to generate an output including: (i) a current prediction for whether the image depicts an object or a background region, and (ii) a current embedding of the image. Multiple current cluster centers are determined based on the current values of the categorization neural network parameters, where each cluster center represents a respective semantic category. A gradient of an objective function that includes a classification loss and a clustering loss is determined. The classification loss depends on the current prediction for whether the image depicts an object or a background region, and the clustering loss depends on a similarity between the current embedding of the image and the current cluster centers. An update to the current values of the categorization neural network parameters is determined from the gradient.

After training the categorization neural network, final cluster centers are determined based on the trained values of the categorization neural network parameters. Each image is processed using the image using the categorization neural network in accordance with the trained values of the categorization neural network parameters to generate a final embedding of the image. A clustering of the images into a plurality of semantic categories is determined using the final embeddings of the images and the final cluster centers.

In some implementations, the images are generated by processing training images, including, for each training image, generating a depth-augmented training image by determining a depth associated with each pixel in the training image. The pixels of the depth-augmented training image are clustered using: (i) the intensity data associated with the pixels of the training image, and (ii) the depths of the pixels of the training image. One or more images depicting objects are generated based on the clustering of the pixels of the depth-augmented training image.

In some implementations, determining a depth associated with each pixel in the training image includes processing the training image by using a depth estimation neural network in accordance with trained values of depth estimation neural network parameters to generate an output comprising a depth associated with each pixel in the training image.

In some implementations, the depth estimation neural network is trained using an unsupervised machine learning training technique.

In some implementations, generating one or more images depicting objects using the clustering of the pixels of the depth-augmented training image includes cropping the images depicting objects from the training image based on the clustering of the pixels of the depth-augmented training image.

In some implementations, determining the current cluster centers based on the current values of the categorization neural network parameters includes obtaining the current cluster centers from a memory unit of the categorization neural network.

In some implementations, the clustering loss includes a minimum over each current cluster center of a difference between the current cluster center and the current embedding of the image.

In some implementations, the clustering loss further includes a measure of how evenly images are distributed between the current cluster centers.

In some implementations determining the clustering of the images into the semantic categories includes, for each image, assigning the image to a closest final cluster center to the final embedding of the image. For each final cluster center, the images assigned to the final cluster center are determined as belonging to the same semantic category.

In some implementations, the categorization neural network includes convolutional neural network layers.

In some implementations, the current embedding of the image is an intermediate output of the categorization neural network.

In some implementations, the method further includes, at each of multiple training iterations, processing an image depicting a background region using the categorization neural network in accordance with current values of categorization neural network parameters to generate an output comprising a current prediction for whether the image depicts an object or a background region. A gradient of an objective function that includes the classification loss is determined, and an update to the current values of the categorization neural network parameters is determined from the gradient.

According to a second aspect there are provided one or more computer storage media storing instructions that when executed by one or more computers cause the one or more computers to perform operations including the operations of the first aspect.

According to a third aspect there is provided a system including a data processing apparatus and a memory in data communication with the data processing apparatus and storing instructions that cause the data processing apparatus to perform operations including the operations of the first aspect.

Particular embodiments of the subject matter described in this specification can be implemented so as to realize one or more of the following advantages.

The system described in this specification can detect objects from images and learn to classify them into semantic categories without manual supervision. In contrast, some conventional classification systems must be trained using large amounts of manually labeled training data (which can be expensive and difficult to obtain) and can classify objects as belonging to only a predefined set of semantic categories (e.g., a vehicle category or a person category). The system described in this specification does not require manually labeled training data, and learns to classify objects into emergent semantic categories which are directly learned from raw image data. The semantic categories learned by the system described in this specification can be used for low-shot learning or active learning (where very small amounts of labeled training data are used for learning). These are improvements in the fields of image processing and machine learning.

The system described in this specification performs simultaneous image embedding and image clustering. By jointly learning to perform image embedding and image clustering, the system described in this specification can learn to cluster images more effectively than if these tasks (i.e., embedding and clustering) were performed separately (e.g., as in some conventional systems). Moreover, the system described in this specification may consume fewer computational resources (e.g., memory and computing power) than some conventional systems since jointly performing image embedding and image clustering enables these tasks to be performed more efficiently (e.g., over fewer iterations) than if they were performed separately. This is also an improvement in the fields of image processing and machine learning.

The system described in this specification can localize objects in an image by processing a "depth-augmented" representation of the image, i.e., that characterizes both the colors and the depths of the pixels in the image. By processing the depth-augmented image (e.g., rather than the original image), the system may localize objects depicted in the image more accurately since objects in the depth-augmented image are more likely to be well separated and are naturally normalized for scale. This is an improvement in the field of image processing.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that retrieves objects from images and learns to cluster them into semantic categories without manual supervision.

Figure 1:
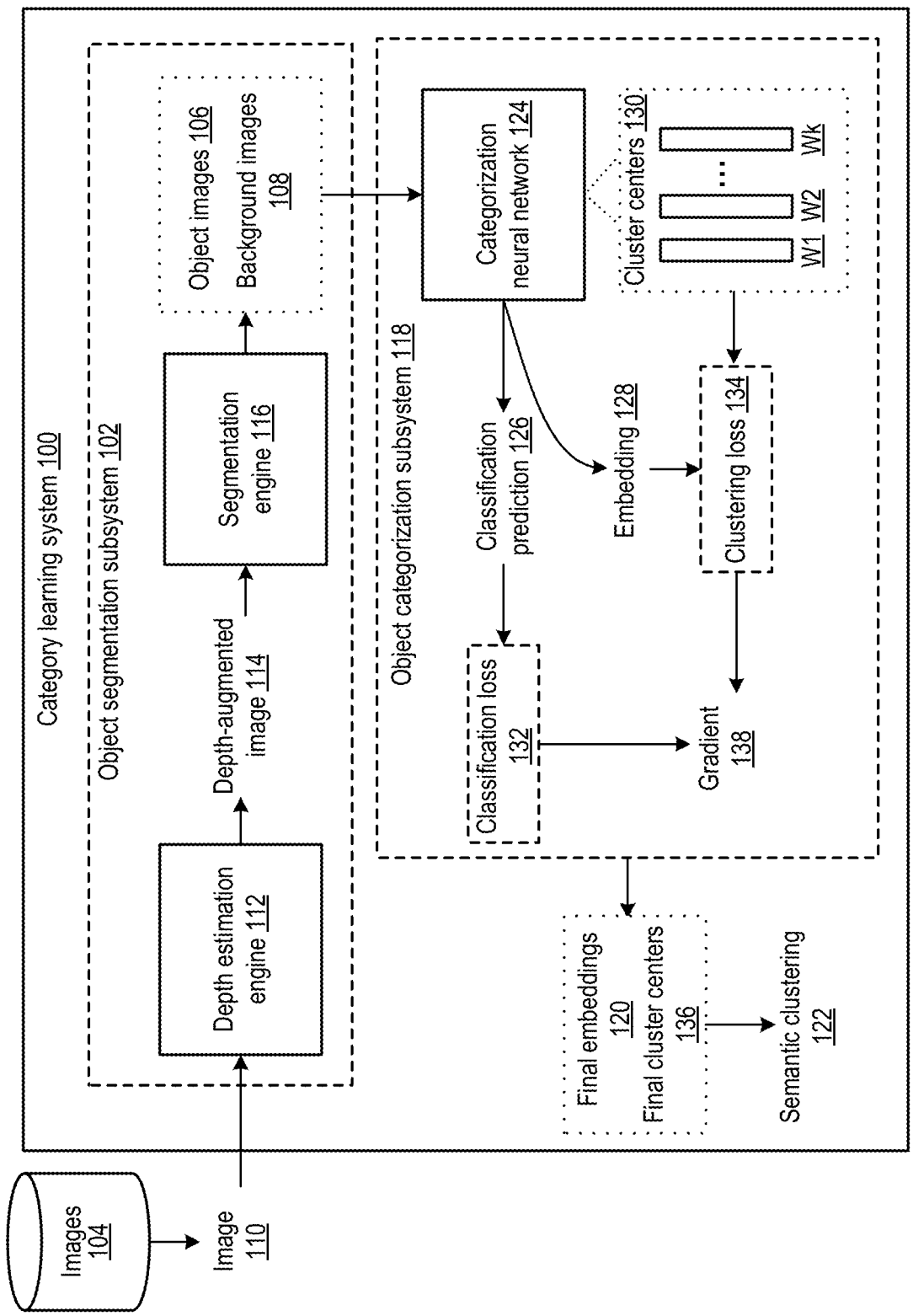
FIG. 1 shows an example category learning system.

FIG. 1 shows an example category learning system 100. The category learning system 100 is an example of a system implemented as computer programs on one or more computers in one or more locations in which the systems, components, and techniques described below are implemented.

The category learning system 100 includes an object segmentation subsystem 102 which is configured to process a set of input images 104 to generate object images 106 and background images 108. Generally, the object images 106 and the background images 108 are cropped (or otherwise obtained) from the input images 104. The object images 106 depict foreground objects (e.g., cars, people, animals, bicycles, and the like) while the background images 108 depict background regions (i.e., regions which are behind foreground objects). The input images 104 may be selected from a particular class images, for example, images depicting urban driving scenes.

To generate the object images 106 and the background images 108, the system 100 provides each input image 110 to a depth estimation engine 112 which is configured to determine a depth of each pixel of the image 110. The depth of a pixel (which can be represented as a number) reflects a distance from the image plane to the region of the image 110 represented by the pixel.

The depth estimation engine 112 generates an output including a depth-augmented image 114, where each pixel of the depth-augmented image 114 is associated with both the color data of the pixel from the image 110 and the determined depth of the pixel. The color data of a pixel may be represented by, for example, respective intensities of a red color channel, a green color channel, and a blue color channel (i.e., the red-green-blue (RGB) color representation).

The system 100 processes the depth-augmented image 114 by a segmentation engine 116 which is configured to generate the object images 106 and the background images 108. To generate the object images 106 and background images 108, the segmentation engine 116 may localize objects depicted in the image 110 by clustering the pixels of the depth-augmented image 114 (e.g., using a k-means or expectation-maximization (EM) clustering algorithm). Localizing an object in the image 110 refers to determining the position of the object in the image (e.g., by determining a bounding box in the image 110 containing the object). Clustering the pixels of the depth-augmented image 114 refers to assigning each pixel of the depth-augmented image to a respective group based on the color and depth data associated with the pixel, where pixels from the same group are more similar (e.g., according to some numerical similarity measure) than pixels from different groups. The segmentation engine 116 may determine that one or more of the pixel groups determined by clustering the pixels of the depth-augmented image 114 represent respective objects depicted in the image 110. By clustering the pixels of the depth-augmented image 114 (e.g., rather than the pixels of the image 110), the system 100 may localize objects depicted in the image 110 more accurately since objects in the depth-augmented image 114 are more likely to be well separated and are naturally normalized for scale.

After localizing the objects depicted in the image 110 using the depth-augmented image 114, the segmentation engine 116 can generate the object images 106 by cropping the localized objects from the image 110. For example, the segmentation engine 116 can generate the object images 106 by cropping bounding boxes containing respective localized objects from the image 110. The segmentation engine 116 can generate the background images 108 analogously, by cropping regions (e.g., as defined by bounding boxes) from the image 110 which do not include any localized objects.

In some implementations, the object segmentation subsystem 102 (e.g., including the depth estimation engine 112 and the segmentation engine 116) may be trained without manual supervision, for example, on a training set of raw images. A raw image refers to an image where the objects depicted in the image are not manually segmented by a person (e.g., using a non-automated or semi-automated segmentation procedure). For example, the depth estimation engine 112 may be trained using an unsupervised machine learning depth regression training technique and the segmentation engine 116 may implement unsupervised clustering.

The system 100 provides the object images 106 and the background images 108 as an input to an object categorization subsystem 118. The object categorization subsystem 118 is configured to use the input to jointly learn: (i) a final embedding 120 of each object image 106, and (ii) a semantic clustering 122 of the object images 106. An embedding of an image (e.g., a final embedding 120) refers to a numerical representation of the image, for example, as a vector or a matrix. A semantic clustering 122 of the object images 106 refers to the assignment of the object images 106 to respective groups based on shared qualities or characteristics. For example, the semantic clustering 122 may assign object images 106 depicting cars to one group and object images 106 depicting people to another group.

The system 100 jointly learns the final embeddings 120 and the semantic clustering 122 of the object images 106 by training a categorization neural network 124. The categorization neural network 124 is configured to process an input including an image (e.g., an object image 106 or background image 108) to generate an output including (i) a classification prediction 126 indicating whether the input image depicts an object or a background region, and (ii) an embedding 128 of the input image. Moreover, the categorization neural network 124 is configured to maintain parameters (e.g., weights) which define multiple different cluster centers 130 (e.g., the cluster centers $W_1, W_2, \ldots,$ and $W_k$ depicted in FIG. 1). Each cluster center 130 is an ordered collection of numerical values (e.g., represented as a vector or a matrix) with the same dimensionality as the embeddings 128 generated by the categorization neural network 124. The value of each component of each cluster center 130 may be defined by a respective parameter of the categorization neural network 124. As will be described in more detail later, each cluster center 130 represents a different group (i.e., semantic category) in the semantic clustering 122.

The categorization neural network 124 can be implemented as a convolutional neural network, a fully-connected neural network, or in any other appropriate configuration. In a particular example, the categorization neural network 124 can include one or more convolutional neural network layers followed by one or more fully-connected neural network layers. In this example, the categorization neural network 124 may generate the classification prediction 126 by a soft-max layer which processes the output of a fully-connected layer, and the categorization neural network 124 may determine the embedding 128 to be given by the activations generated at a fully-connected layer.

Training the categorization neural network 124 refers to determining trained values of the categorization neural network parameters (including the cluster centers 130) from initial values of the categorization neural network parameters. The system 100 trains the categorization neural network 124 by updating the current values of the categorization neural network parameters (including the cluster centers 130) at each of multiple training iterations. At each training iteration, the system 100 selects an image to be used to train the categorization neural network 124. The image may be an object image 106 or a background image 108. The system 100 processes the selected image in accordance with current values of categorization neural network parameters to generation a classification prediction 126 for the selected image and an embedding 128 of the selected image. The system 100 updates the current values of the categorization neural network parameters using a gradient 138 with respect to the categorization neural network parameters of an objective function that depends on the classification prediction 126 for the selected image and the embedding 128 of the selected image.

The objective function includes a classification loss 132 and, when the selected image is an object image 106, a clustering loss 134. The classification loss 132 encourages the classification prediction 126 to accurately discriminate between whether the selected image depicts an object or a background region. The clustering loss 134 encourages the embedding 128 to be similar (e.g., according to some numerical similarity measure) to at least one of the cluster centers 130. In some implementations, the objective function includes the clustering loss 134 only when the selected image is an object image 106 because the background images 108 are not included in the semantic clustering 122 (i.e., and therefore should not affect the learned values of the cluster centers 130).

After training the categorization neural network 124, the system 100 processes the object images 106 in accordance with the trained values of the categorization neural network parameters to generate a final embedding 120 of each object image 106, and obtains the final cluster centers 130 defined by the trained values of the categorization neural network parameters. The system 100 determines the semantic clustering 122 based on the final embeddings 120 and the final cluster centers 136. For example, the system 100 may assign each object image 106 to a respective final cluster center 136 that is closest to the final embedding 120 of the object image 106, and for each final cluster center 136, determine the object images 106 assigned to the final cluster center 136 to belong to the same semantic category. As described earlier, object images 106 determined to belong to the same semantic category may share certain qualities or characteristics. For example, the semantic clustering 122 may determine object images 106 depicting cars as belonging to a first semantic category, and may determine object images 106 depicting people as belonging to a second semantic category. The semantic clustering 122 may define emergent semantic categories which are learned directly from the object images 106 rather than being predefined.

The object images generated by the object segmentation subsystem described with reference to FIG. 1 can be used for any of a variety of purposes (i.e., alternatively or in addition to being used to train the object categorization subsystem).

For example, the object images can be used for semi-supervised learning, low-shot learning, or active learning purposes (e.g., where very small amounts of labeled training data are used for learning). As described above, the object segmentation subsystem can automatically generate large numbers of object images in an unsupervised manner by processing raw images or video frames. In one example application, the object images may be used to augment a training set of labeled object images, and the augmented training set can be used to train a prediction neural network using semi-supervised learning techniques. In a particular example, the labeled object images may each be associated with a label that specifies a type of object depicted in the image, and the prediction neural network may be a classification neural network that is configured to process an image to predict the type of object depicted in the image. Example object types are person, vehicle, building, and the like.

The semantic categories learned by the system described in this specification can be used for any of a variety of purposes. In one example, the semantic categories can be used to facilitate manual labeling of object images. In particular, the object categorization subsystem can be used to cluster large numbers of unlabeled object images (e.g., generated by the object segmentation subsystem) into semantic categories. A human labeler can review the object images in each semantic cluster, identify and remove any object images having a semantic category that does not match the remaining object images in the semantic cluster, and associate a single label (e.g., person or vehicle) with the remaining images. This procedure for manually labeling object images may, in some cases, be substantially faster than sequentially labeling individual object images with potentially different object labels.

Figure 2:
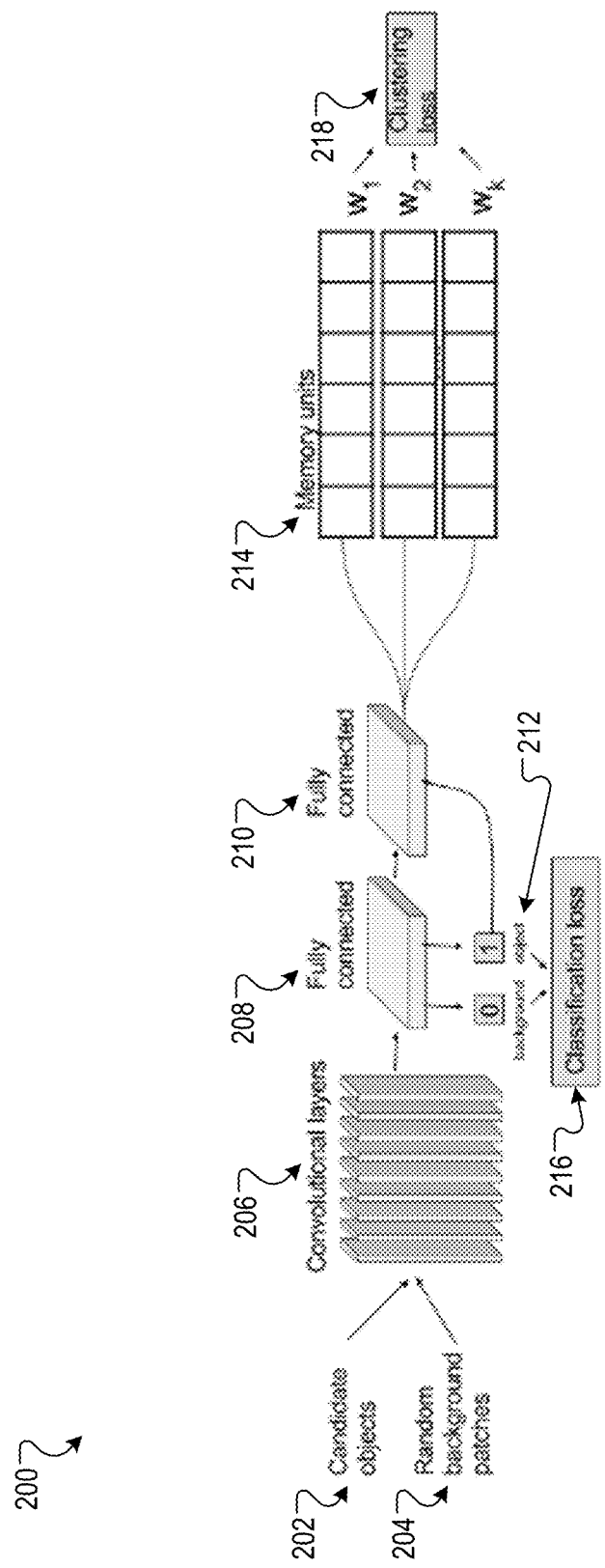
FIG. 2 illustrates an example architecture of a categorization neural network.

FIG. 2 illustrates an example architecture 200 of a categorization neural network, e.g., the categorization neural network 124 described with reference to FIG. 1.

The categorization neural network is configured to process an image to generate: (i) a classification output characterizing a prediction for whether the image depicts an object or a background region, and (ii) an embedding of the image. The image may be, e.g., an object image 202 that depicts an object, or a random background patch 204 that depicts a background region (i.e., without depicting a foreground object). The object images 202 and the random background patches 204 may be generated using an object segmentation subsystem, e.g., the object segmentation subsystem 102 described with reference to FIG. 1.

In the example architecture depicted in FIG. 2, the categorization neural network includes a set of multiple convolutional layers 206, a first fully-connected layer 208, and a second fully-connected layer 210. The categorization neural network processes the output of the first fully-connected layer 208 using an output layer (including a soft-max activation function) to generate the classification output 212. The output of the first fully-connected layer also represents the current embedding of the input image. The parameters (e.g., weights) of the second fully-connected layer 210 represent the memory units 214 that define the current cluster centers $W_1, W_2, \ldots,$ and $W_k$.

The parameter values of the categorization neural network are adjusted during training using the classification loss 216 and the clustering loss 218. In some implementations, the parameter values of the convolutional layers 206 are pre-trained, and their values are not adjusted during the training of the parameter values of the first fully-connected layer 208 and the second fully-connected layer 210. In one example, the parameter values of the convolutional layers 206 may be pre-trained to perform a classification task (e.g., predicting whether an image depicts certain types of objects) or a regression task (e.g., predicting the coordinates of bounding boxes that enclose objects in an image).

Figures 3, 4:
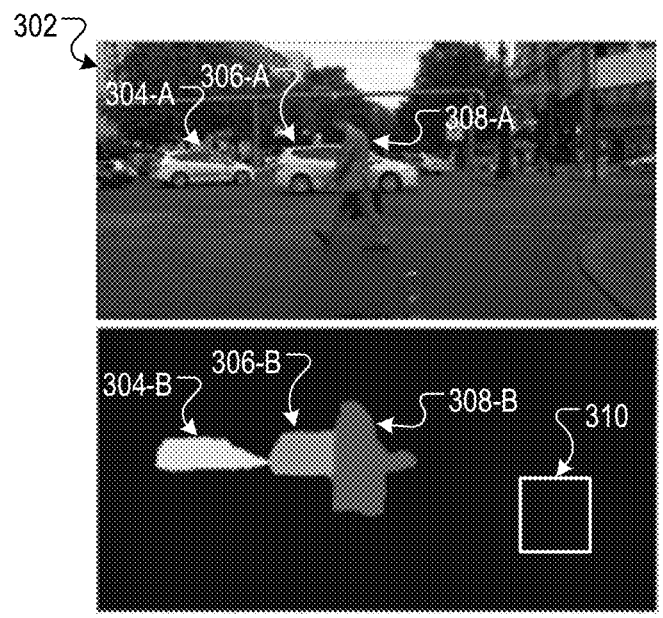
FIG. 3 illustrates foreground objects that can be identified in an image by an unsupervised object segmentation subsystem.
FIG. 4 shows a table that describes example results of using the category learning system to retrieve objects from images and cluster them into semantic categories.

FIG. 3 illustrates foreground objects that can be identified in an image 302 by an unsupervised object segmentation subsystem, e.g., the object segmentation subsystem 102 described with reference to FIG. 1. The image 302 depicts a variety of objects, e.g., a first car 304-A, a second car 306-A, and a person 308-A. The object segmentation subsystem can process the image 302 to identify, e.g., a cluster of pixels 304-B that corresponds to the first car 304-A, a cluster of pixels 306-B that corresponds to the second car 306-A, and a cluster of pixels 308-B that corresponds to the person 308-A. The object segmentation subsystem can generate object images (i.e., depicting foreground objects) by cropping regions of the image 302 that correspond to respective clusters of object pixels, and background images by cropping regions of the image 302 (e.g., enclosed by the bounding box 310) that do not enclose any foreground objects.

FIG. 4 shows a table 400 that describes example results of using the category learning system described with reference to FIG. 1 to retrieve objects from images and cluster them into semantic categories. In this example, each row of the table corresponds to a respective object category (e.g., "Person", "Rider", "Car", etc.), and the category learning system has retrieved objects and clustered them into three clusters (i.e., "Cluster 0", "Cluster 1", and "Cluster 2"). It can be appreciated that the category learning system has generated semantically meaningful clusters even in the absence of any supervision signals (e.g., that label the positions or types of objects in images). For example, Cluster 0 includes many of the car objects, Cluster 1 includes many of the building objects, and Cluster 2 includes many of the person objects.

Figure 5:
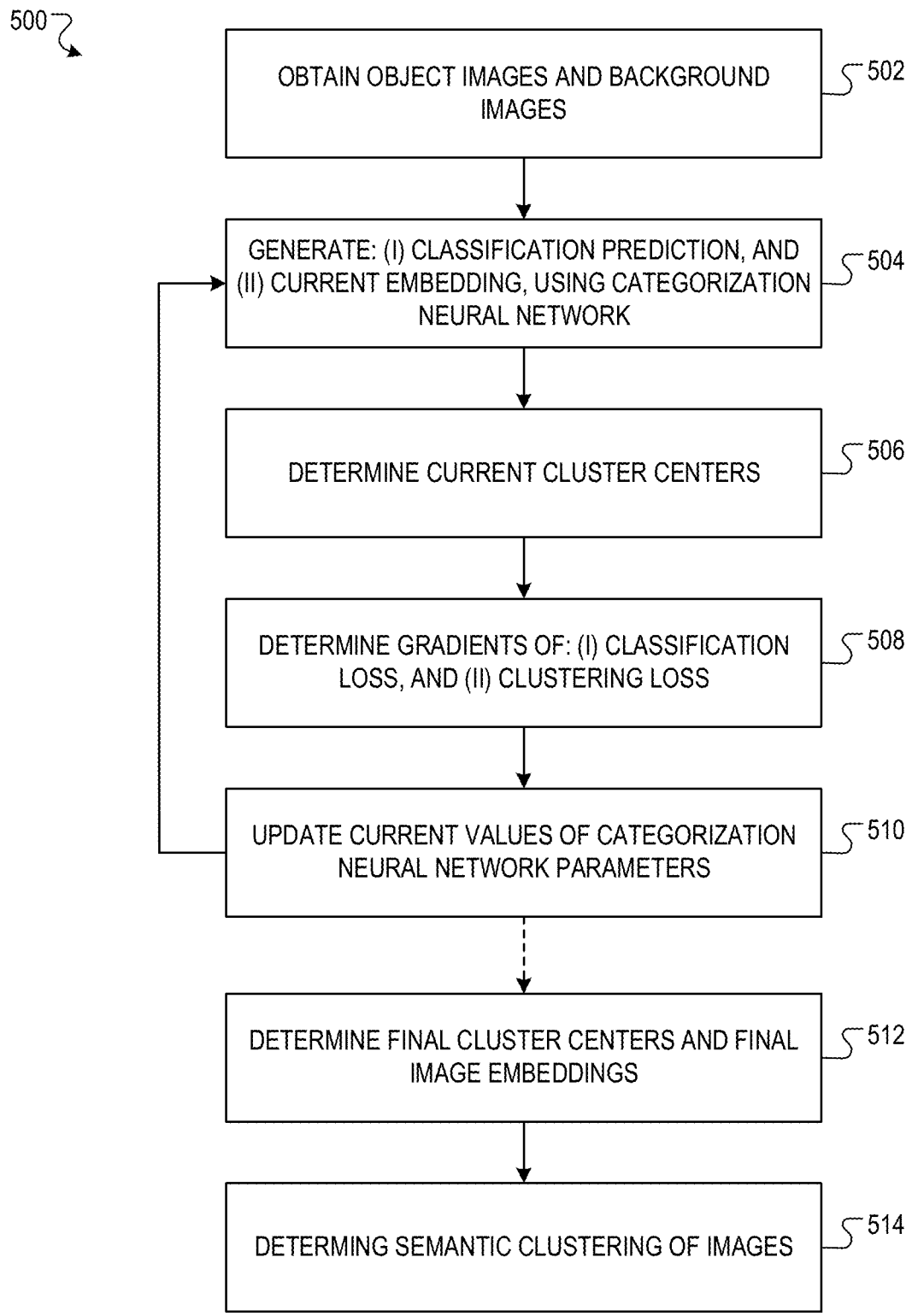
FIG. 5 is a flow diagram of an example process for determining a semantic clustering of images.

FIG. 5 is a flow diagram of an example process 500 for determining a semantic clustering of images. For convenience, the process 500 will be described as being performed by a system of one or more computers located in one or more locations. For example, a category learning system, e.g., the category learning system 100 of FIG. 1, appropriately programmed in accordance with this specification, can perform the process 500.

The system obtains object images and background images (502). An example process for obtaining object images and background images using unsupervised machine learning techniques is described in more detail with reference to FIG. 6.

Steps 504-510 of the process 500, which will be described in more detail next, are performed at each of multiple training iterations. The description which follows references a particular training iteration.

For each of one or more images, the system processes the image using a categorization neural network to generate an output including: (i) a current prediction for whether the image depicts an object or a background region, and (ii) a current embedding of the image (504). The system may obtain the images, e.g., by randomly sampling a predetermined number of images. The current prediction for whether an image depicts an object or a background region may be represented, e.g., as a numerical probability value between 0 and 1 that indicates a likelihood that the image depicts an object. The current prediction for whether an image depicts an object or a background region may be generated by an output layer of the categorization neural network, while the current embedding of the image may be an intermediate output of the categorization neural network. An intermediate output of a neural network refers to an output that is generated by an intermediate layer of the neural network, i.e., a layer that follows the input layer(s) of the neural network but precedes the output layer(s) of the neural network.

The system determines multiple current cluster centers based on the current values of the categorization neural network parameters, where each cluster center implicitly represents a respective semantic category (506). More specifically, the system determines the multiple cluster centers from a "memory unit" of the categorization neural network, that is, a set of parameters (e.g., weights) that are maintained by the categorization neural network. In a particular example illustrated with reference to FIG. 2, the categorization neural network may maintain the set of parameters that define the current cluster centers as a set of parameters (weights) of a fully-connected neural network layer.

The system determines gradients of an objective function that includes a classification loss and a clustering loss with respect to the current values of the categorization neural network parameters (i.e., including the cluster center values maintained by the categorization neural network) (508). Generally, for each image, the classification loss depends on the current prediction for whether the image depict an objects or a background region, and the clustering loss depends on a similarity between the current embedding of the image and the current cluster centers.

In one example, the objective function $\mathcal{L}$ may be given by:

$$\mathcal{L} = \alpha_1 \cdot \mathcal{L}_{classification} + \alpha_2 \cdot \mathcal{L}_{clustering} + \alpha_3 \cdot \mathcal{L}_{regularization} \quad (1)$$

where $\mathcal{L}_{classification}$ is the classification loss, $\mathcal{L}$ clustering is the clustering loss, $\mathcal{L}_{regularization}$ is a regularization loss, and $\{\alpha_i\}_{i=1}^{3}$ are scalar hyper-parameters.

The classification loss can be any appropriate loss that characterizes how accurately the classification outputs predict whether the images depict objects or background regions, e.g., a (binary) cross entropy classification loss.

The clustering loss generally depends, for each image, on the similarity between the current embedding of the image and each of the cluster centers, e.g., the clustering loss may be given by:

$$\mathcal{L}_{clustering} = \frac{1}{2N} \sum_{n=1}^{N} \min_{k=1 \ldots K} [(x - w_k)^2] \quad (2)$$

where N is the number of images, K is the number of cluster centers, x is the current embedding of the image, and $w_k$ is the k-th cluster center. It can be appreciated that the clustering loss is increasingly optimized as the embedding of each image is closer to one or more of the cluster centers. That is, the clustering loss encourages the generation of image embeddings and cluster centers with the property that each image embedding is close to at least one cluster center. The clustering loss described with reference to equation (2) is provided for illustrative purposes, but other clustering losses are possible. The clustering loss is typically only applied to those images that are predicted by the categorization neural network to correspond to objects, i.e., and not applied to those images that are predicted by the categorization neural network to correspond to background regions.

In some implementations, the clustering loss includes an additional "evenness" term that measures how evenly images are distributed between the current clusters. More specifically, the evenness term of the clustering loss characterizes the proportion of the images that are assigned to each cluster center. An image is said to be assigned to a particular cluster center if the current embedding of the image is closer (e.g., according to some numerical similarity measure, e.g., an $L_2$ similarity measure) to the particular cluster center than to any of the other cluster centers. Generally, the evenness term of the clustering loss encourages the images to be evenly distributed between the cluster centers, e.g., so that similar numbers of images are assigned to each cluster center. In one example, the evenness term $M_C$ of the clustering loss is given by:

$$M_C = \frac{1}{N^K} \sum_{k=0}^{K} \sum_{j=k}^{K} |count_k - count_j| \quad (3)$$

where N is the number of images, K is the number of cluster centers, and count is the number of images that are assigned to cluster center i.

The regularization loss has the effect of "regularizing" (e.g., stabilizing) the training of the categorization neural network. In one example, the regularization loss is given by:

$$\mathcal{L}_{regularization} = \sum_{k=0}^{K} |w_k|_2^2 \quad (4)$$

where K is the total number of cluster centers, $w_k$ is cluster center k, and $|\bullet|_2^2$ is the squared $L_2$ norm.

The system can determine gradients of the objective function using, e.g., backpropagation techniques. In one example, the system may determine the gradients of the clustering loss described with reference to equation (2) as:

$$\nabla w_k = \sum_{n=1}^{N} \begin{cases} l_r(x_n - w_k) & \text{if } k = s(x_n, w) \\ 0 & \text{otherwise} \end{cases} \quad (5)$$

$$s(x_n, w) = \operatorname{argmin}_k[(x_n - w_k)^2] \quad (6)$$

where $\nabla w_k$ is the gradient of the clustering loss with respect to cluster center k, $l_r$ is a learning rate hyper-parameter, N is the total number of images, $x_n$ is the current embedding of image n, $w_k$ is cluster center k, and $s(x_n, w)$ returns the index of the cluster center closest to $x_n$.

In some cases, the system determines gradients of the objective function with respect to all of the categorization neural network parameters, and updates the current values of all the categorization neural network parameters using the gradients (as will be described in more detail below). In other cases, the system determines gradients of the objective function with respect to only a proper subset of the categorization neural network parameters, and updates the current values of only the proper subset of the categorization neural network parameters using the gradients.

The system updates the current values of some or all of the categorization neural network parameters using the gradients (510). The system can update the current values of the categorization neural network parameters using any appropriate gradient descent optimization technique, e.g., an Adam optimization technique or an RMSprop optimization technique.

In some cases, the system updates the current values of the categorization neural network parameters using gradients of the classification loss and the clustering loss at each training iteration, as described above. In other cases, the system may alternate between updating the current values of the categorization neural network parameters using the classification loss and the clustering loss. For example, the system may train the categorization neural network using the classification loss but not the clustering loss for a first set of training iterations, the system may train categorization neural network using the clustering loss but not the classification loss for a second set of training iterations, and so on.

At the conclusion of each training iteration, the system determines whether a training termination criterion is satisfied. For example, the system may determine that a training termination criterion is satisfied if a predetermined number of training iterations have been performed.

In response to determining that a training termination criterion is not satisfied, the system returns to step 504.

In response to determining that a training termination criterion is satisfied, the system determines "final" cluster centers and "final" embeddings of the images (512). The system determines the final cluster centers based on the trained values of the categorization neural network parameters. For each image, the system determines the final embedding of the image by processing the image in accordance with the trained values of the categorization neural network parameters.

The system determines a clustering of the images into semantic categories using the final embeddings of the images and the final cluster centers (514). In one example, for each image, the system assigns the image to the final cluster center that is closest to the final embedding of the image. Then, for each final cluster center, the system determines the images assigned to the final cluster center as belonging to the same semantic category.

Figure 6:
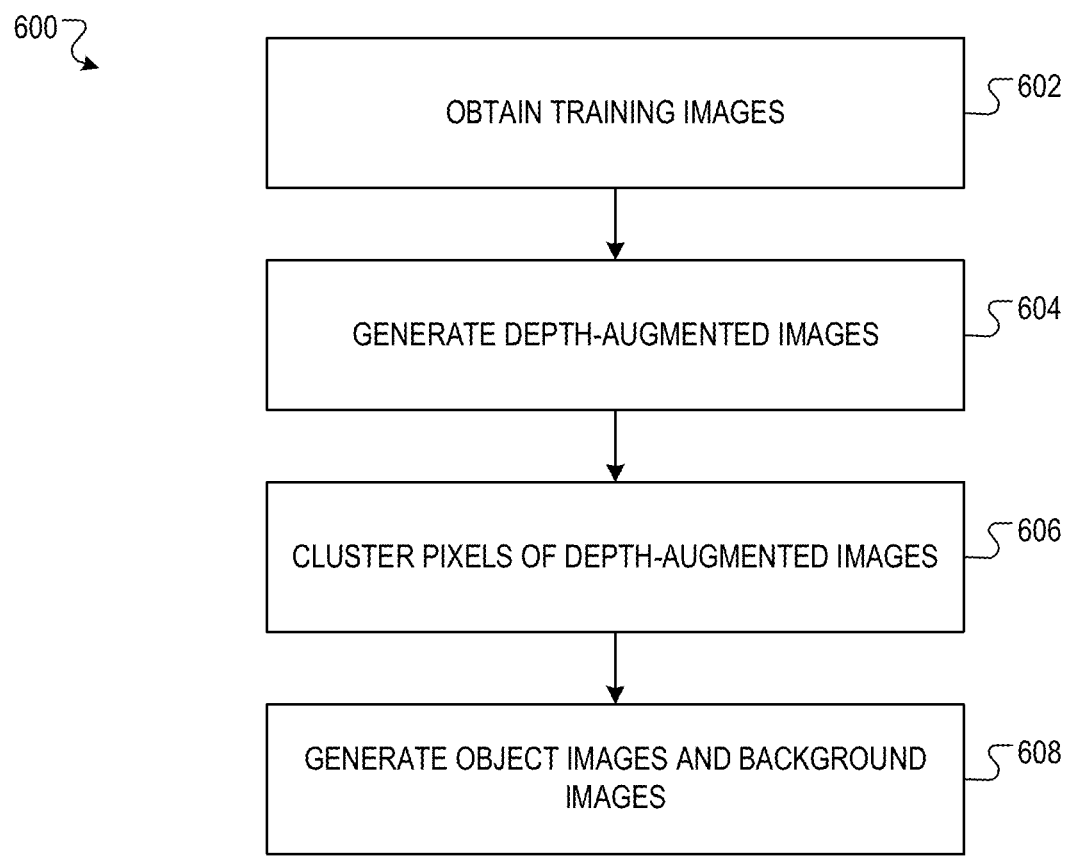
FIG. 6 is a flow diagram of an example process for obtaining object images and background images from a set of training images.

FIG. 6 is a flow diagram of an example process 600 for obtaining object images and background images from a set of training images. For convenience, the process 600 will be described as being performed by a system of one or more computers located in one or more locations. For example, a category learning system, e.g., the category learning system 100 of FIG. 1, appropriately programmed in accordance with this specification, can perform the process 600.

The system obtains a set of training images (602). The training images may be, e.g., images depicting urban driving scenes.

For each training image, the system determines the depth of each pixel of the training image, and thereafter generates a corresponding depth-augmented training image (604). The system can determine the depths of the pixels in a training image, e.g., by processing the training image using a depth estimation neural network in accordance with trained values of depth estimation neural network parameters to generate an output specifying a depth associated with each pixel. The depth estimation neural network may be trained using unsupervised training techniques on sequences of video frames, for example, using methods described with reference to: Godard, C., Aodha, O. M., Brostow, G. J.: Unsupervised monocular depth estimation with left-right consistency, Conference on Computer Vision and Pattern Recognition (CVPR), 2017. The system can generate a depth-augmented training image by channel-wise concatenating the color data and the depth data for the training image.

For each depth-augmented training image, the system clusters the pixels of the depth-augmented training image using: (i) the intensity (color) data associated with the pixels of the training image, and (ii) the depths of the pixels of the training image (606). In one example, to cluster the pixels of the depth-augmented training image, the system may start by identifying the ground plane in the depth-augmented training image, e.g., using the point cloud library (PCL) ground plane estimation method. The system may then remove points that are at least a threshold number of pixels above the ground plane, or that have a depth that exceeds a predetermined threshold, from further consideration. The system can iteratively group similar regions (or points), and then merge the resulting regions using agglomerative clustering techniques to generate clusters (i.e., sets) of points (pixels) that are predicted to correspond to respective objects.

The system generates object images and background images based on the clustering of the pixels of the depth-augmented training images (608). For example, for each training image, the system can generate respective object images by cropping regions of the training image that correspond to clusters of object pixels. For each training image, the system can generate respective background images by cropping regions of the training image that do not include object pixels.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method, comprising:
   training a categorization neural network to determine trained values of the categorization neural network parameters from initial values of the categorization neural network parameters, comprising, at each of a plurality of iterations:
      processing a given image depicting an object using the categorization neural network in accordance with current values of categorization neural network parameters to generate an output comprising: (i) a current prediction for whether the given image depicts an object or a background region, and (ii) a current embedding of the given image;
      determining a plurality of current cluster centers based on the current values of the categorization neural network parameters, wherein each cluster center represents a respective semantic category;
      determining a gradient of an objective function that includes a classification loss and a clustering loss, wherein the classification loss depends on the current prediction for whether the given image depicts an object or a background region, and wherein the clustering loss depends on a similarity between the current embedding of the given image and the current cluster centers; and
      determining an update to the current values of the categorization neural network parameters from the gradient;
   determining a plurality of final cluster centers based on the trained values of the categorization neural network parameters;
   for each of a plurality of target images, processing the target image using the categorization neural network in accordance with the trained values of the categorization neural network parameters to generate a final embedding of the target image; and
   determining a clustering of the target images into a plurality of semantic categories using the final embeddings of the target images and the final cluster centers.

2. The method of claim 1, wherein the given image is generated by a plurality of operations comprising:
   generating a depth-augmented training image by determining a depth associated with each pixel in a training image;
   clustering the pixels of the depth-augmented training image using: (i) the intensity data associated with the pixels of the training image, and (ii) the depths of the pixels of the training image; and
   generating the given image based on the clustering of the pixels of the depth-augmented training image.

3. The method of claim 2, wherein determining a depth associated with each pixel in the training image comprises:
   processing the training image by using a depth estimation neural network in accordance with trained values of depth estimation neural network parameters to generate an output comprising a depth associated with each pixel in the training image.

4. The method of claim 3, wherein the depth estimation neural network is trained using an unsupervised machine learning training technique.

5. The method of claim 2, wherein generating the given image using the clustering of the pixels of the depth-augmented training image comprises:
   cropping the given image from the training image based on the clustering of the pixels of the depth-augmented training image.

6. The method of claim 1, wherein determining the current cluster centers based on the current values of the categorization neural network parameters comprises:
   obtaining the current cluster centers from a memory unit of the categorization neural network.

7. The method of claim 1, wherein the clustering loss comprises:
   a minimum over each current cluster center of a difference between the current cluster center and the current embedding of the given image.

8. The method of claim 1, wherein the clustering loss further comprises:
   a measure of how evenly given images are distributed between the current cluster centers.

9. The method of claim 1, wherein determining the clustering of the target images into the plurality of semantic categories using the final embeddings of the target images and the final cluster centers comprises:
   for each target image, assigning the target image to a closest final cluster center to the final embedding of the target image; and
   for each final cluster center, determining the target images assigned to the final cluster center as belonging to a same semantic category.

10. The method of claim 1, wherein the categorization neural network comprises a plurality of convolutional neural network layers.

11. The method of claim 1, wherein the current embedding of the given image is an intermediate output of the categorization neural network.

12. The method of claim 1 further comprising, at each of a plurality of training iterations:
   processing a selected image depicting a background region using the categorization neural network in accordance with current values of categorization neural network parameters to generate an output comprising a current prediction for whether the selected image depicts an object or a background region;

determining a gradient of an objective function that includes the classification loss; and determining an update to the current values of the categorization neural network parameters from the gradient.

13. A system, comprising:
one or more computers;
a memory in data communication with the one or more computers and storing instructions that cause the one or more computers to perform operations comprising:
training a categorization neural network to determine trained values of the categorization neural network parameters from initial values of the categorization neural network parameters, comprising, at each of a plurality of iterations:
processing a given image depicting an object using the categorization neural network in accordance with current values of categorization neural network parameters to generate an output comprising: (i) a current prediction for whether the given image depicts an object or a background region, and (ii) a current embedding of the given image;
determining a plurality of current cluster centers based on the current values of the categorization neural network parameters, wherein each cluster center represents a respective semantic category;
determining a gradient of an objective function that includes a classification loss and a clustering loss, wherein the classification loss depends on the current prediction for whether the given image depicts an object or a background region, and wherein the clustering loss depends on a similarity between the current embedding of the given image and the current cluster centers; and
determining an update to the current values of the categorization neural network parameters from the gradient;
determining a plurality of final cluster centers based on the trained values of the categorization neural network parameters;
for each of a plurality of target images, processing the target image using the categorization neural network in accordance with the trained values of the categorization neural network parameters to generate a final embedding of the target image; and
determining a clustering of the target images into a plurality of semantic categories using the final embeddings of the target images and the final cluster centers.

14. The system of claim 13, wherein the given image is generated by a plurality of operations comprising:
generating a depth-augmented training image by determining a depth associated with each pixel in a training image;
clustering the pixels of the depth-augmented training image using: (i) the intensity data associated with the pixels of the training image, and (ii) the depths of the pixels of the training image; and
generating the given image based on the clustering of the pixels of the depth-augmented training image.

15. The system of claim 14, wherein determining a depth associated with each pixel in the training image comprises:
processing the training image by using a depth estimation neural network in accordance with trained values of depth estimation neural network parameters to generate an output comprising a depth associated with each pixel in the training image.

16. The method of claim 15, wherein the depth estimation neural network is trained using an unsupervised machine learning training technique.

17. One or more non-transitory computer storage media storing instructions that when executed by one or more computers cause the one or more computers to perform operations comprising:
training a categorization neural network to determine trained values of the categorization neural network parameters from initial values of the categorization neural network parameters, comprising, at each of a plurality of iterations:
processing a given image depicting an object using the categorization neural network in accordance with current values of categorization neural network parameters to generate an output comprising: (i) a current prediction for whether the given image depicts an object or a background region, and (ii) a current embedding of the given image;
determining a plurality of current cluster centers based on the current values of the categorization neural network parameters, wherein each cluster center represents a respective semantic category;
determining a gradient of an objective function that includes a classification loss and a clustering loss, wherein the classification loss depends on the current prediction for whether the given image depicts an object or a background region, and wherein the clustering loss depends on a similarity between the current embedding of the given image and the current cluster centers; and
determining an update to the current values of the categorization neural network parameters from the gradient;
determining a plurality of final cluster centers based on the trained values of the categorization neural network parameters;
for each of a plurality of target images, processing the target image using the categorization neural network in accordance with the trained values of the categorization neural network parameters to generate a final embedding of the target image; and
determining a clustering of the target images into a plurality of semantic categories using the final embeddings of the target images and the final cluster centers.

18. The non-transitory computer storage media of claim 17, wherein the given image is generated by a plurality of operations comprising:
generating a depth-augmented training image by determining a depth associated with each pixel in a training image;
clustering the pixels of the depth-augmented training image using: (i) the intensity data associated with the pixels of the training image, and (ii) the depths of the pixels of the training image; and
generating the given image based on the clustering of the pixels of the depth-augmented training image.

19. The non-transitory computer storage media of claim 18, wherein determining a depth associated with each pixel in the training image comprises:
processing the training image by using a depth estimation neural network in accordance with trained values of depth estimation neural network parameters to generate an output comprising a depth associated with each pixel in the training image.

20. The non-transitory computer storage media of claim 19, wherein the depth estimation neural network is trained using an unsupervised machine learning training technique.

* * * * *